United States Patent [19]

Gasbarro

[11] 3,928,634
[45] Dec. 23, 1975

[54] METHOD FOR MARINATING POULTRY PRODUCTS

[76] Inventor: Geno N. Gasbarro, 1305 Noe-Bixby Road, Columbus, Ohio 43227

[22] Filed: Nov. 16, 1973

[21] Appl. No.: 416,692

[52] U.S. Cl. ............... 426/281; 426/644; 426/652
[51] Int. Cl.² ............................................ A23L 1/31
[58] Field of Search ....... 426/56, 58, 212, 281, 371, 426/382, 486; 99/472, 485, 534, 535

[56] References Cited
UNITED STATES PATENTS

| 7,766 | 11/1850 | Starkweather | 426/281 |
|---|---|---|---|
| 474,446 | 5/1892 | Fey | 99/535 |
| 2,629,311 | 2/1953 | Graves | 99/472 |
| 3,370,959 | 2/1968 | Moore et al. | 426/281 |

Primary Examiner—Hyman Lord
Attorney, Agent, or Firm—Francis T. Kremblas, Jr.

[57] ABSTRACT

A method and apparatus for marinating food products such as meat, poultry and the like to induce flavoring agents or tenderizers which is characterized by treating the food product in a closed chamber containing a given quantity of marinade solution. The food product is repetitively agitated in the marinating solution and preferably is repeatedly moved into and out of a pool or bath of said solution while being exposed to a negative pressure created in the chamber. The present invention is further characterized by controlling the amount of absorption of the solution by the food product by controlling the degree of the negative pressure level, the exposure of the product and amount of the marinating solution available to be absorbed. The degree of agitation preferably accomplished by tumbling the food pieces against one another is very important to obtain the desired uniform penetration of the marinade solution.

5 Claims, 4 Drawing Figures

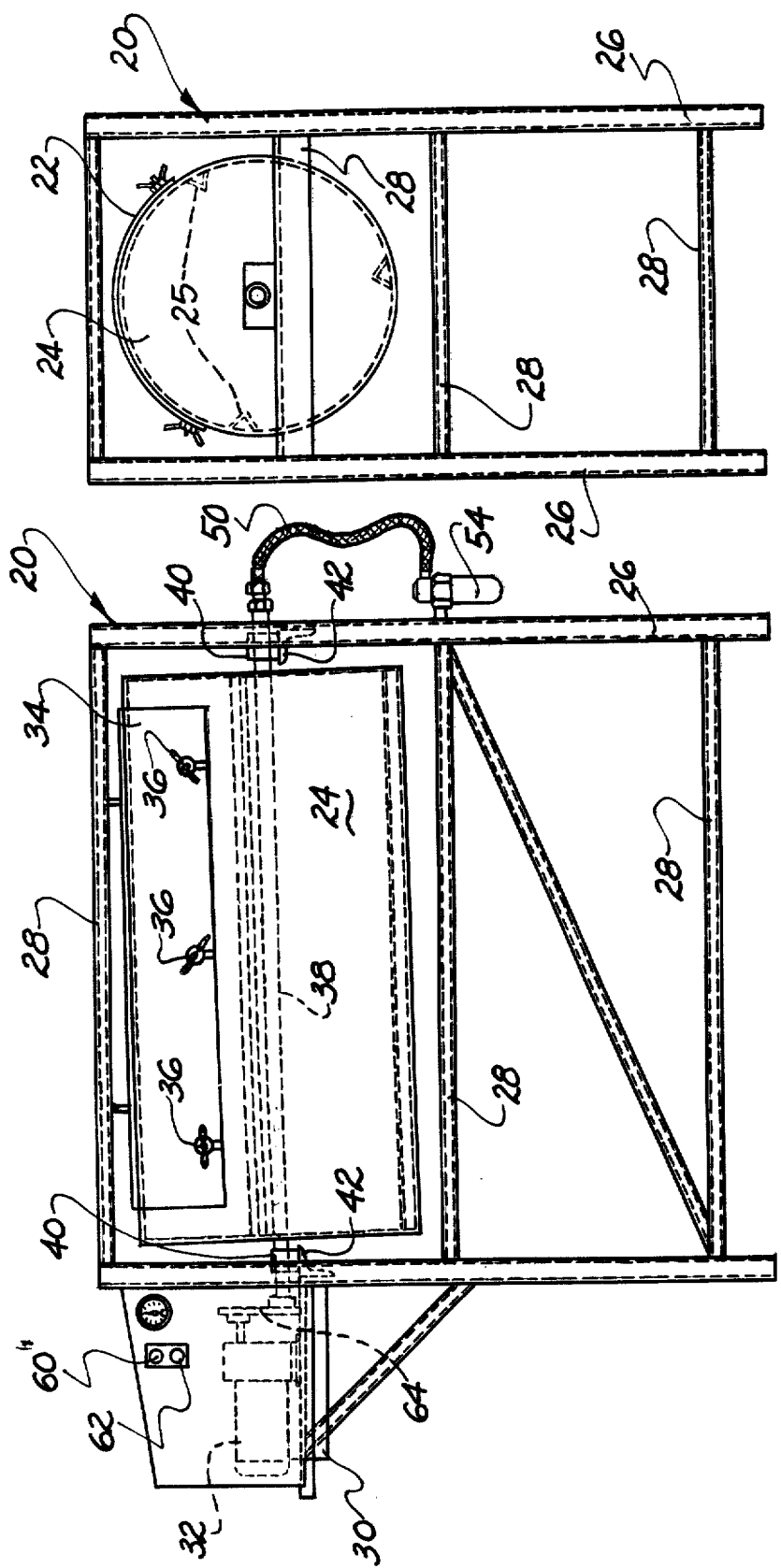

METHOD FOR MARINATING POULTRY PRODUCTS

BACKGROUND

Inducing flavoring agents or tenderizers in meat products by soaking the meat in a marinating solution has long been known and recognized as desirable in the preparation of meats. It has also been known that a particularly difficult problem is encountered with food products such as poultry meat which possesses a fine cellular structure and which is covered by a relatively thick skin. Extended soaking times are necessary even with coarser structured meats and much longer soaking times are required for poultry carcass sections to absorb the minimum desirable quantities of the flavoring agents.

One attempt to solve this problem by not only reducing the preparation time but also to induce more of the marinating agent is represented by U.S. Pat. No. 3,370,959. In this patent, the suggested method is to first pierce the poultry piece with a large number of small pins prior to submerging it in a bath of the marinating solution contained in a vacuum chamber. Then the air is withdrawn from the chamber for a given period of time and then atmospheric pressure or a multiple of atmospheric pressure is reintroduced into the chamber. While this method may be somewhat quicker than merely submerging an unpierced product in the solution for the same length of time, a truly significant amount of the flavoring agent is not absorbed by the food product in the short time periods desired. Further, for commercial purposes, the manner and means necessary to pierce the product is less than wholly satisfactory for most applications.

In order to be commercially useful, the food product must not only be treated in a relatively quick manner, but also must be treated in a manner which induces a significant amount of the flavoring agent in a short time period, such as less than 30 minutes and preferably around 5-15 minutes.

This is particularly important in the fast food restaurant industry wherein large quantities of poultry, steaks or the like are sold and the normal fluctuation of day to day business is difficult to predict with accuracy.

The handling of a large volume of product, which requires pre-treatment in an unfrozen condition, results in the discarding of any portion unsold during the day after marinating because of health requirements. If the estimate is too high the losses could be disasterous. On the other hand, since the risk of large losses is great and a more conservative amount of product is usually prepared, lost sales result when the daily inventory is less than the demand. These lost sales can lead to further losses on repeat business if the customer is lost to a competitor.

Therefore, a long recognized need has existed for a method and apparatus of quickly and effectively marinating food products which can be adapted to fill the demand for this type of product on a short notice basis. The solution to this problem must also be accomplished in an easy fashion which requires the minimum of labor, attention and other special requirements so as not to increase costs beyond commercial acceptability.

SUMMARY OF INVENTION

The present invention relates to a method and apparatus for marinating food products in a fast yet very efficient manner to produce a more desirable product to the consumer.

The invention is characterized by the discovery that surprising and highly desirable results are obtained by subjecting the food products, poultry meat in particular, to relatively gentle agitation against one another or the walls of the container while in contact with sufficient amounts of the marinade solution. Further, it has been found that subjecting conventionally prepared sections of poultry carcasses to negative pressure during this agitation process enhances the penetration of the marinade particularly into the bone of the carcass pieces.

Of particular interest is the discovery that no specialized preparation, such as piercing the meat or the like, is needed to obtain absorption of surprising amounts of the marinade in a very short time period. Further, it has been found that the amount of absorption can be relatively easily controlled while the uniformity of absorption remains relatively constant as determined by taste of the final cooked product as well as precise analysis of the salt content.

The amount of absorption as well as the uniformity of absorption utilizing tumbling of the food pieces or other forms of gentle agitation of the carcass sections in the present invention provides a truly better result in a much shorter time than heretofore known in the food preparation industry.

The simplicity of the apparatus and method of the present invention lends itself to inexpensive construction and maintenance much improved over all prior art attempts to deal with this food handling problem.

OBJECTS

It is therefore an object of the present invention to provide a method and apparatus of marinating poultry and other meat products which induces absorption of significant amounts of the marinating solution in the shortest possible time.

It is another object of the present invention to provide a method and apparatus of the type described wherein the products need no additional pretreatment than required for conventional preparation prior to the marinating treatment.

It is another object of the present invention to provide a method and apparatus of the type described wherein the marinating solution is more uniformly absorbed throughout the meat product as compared to prior methods and means.

It is another object of the present invention to provide a method and apparatus of the type described which is extremely simple to operate and requires no significant skills of the operator.

It is still another object of the present invention to provide an apparatus of the type described which is of simple and inexpensive construction and which is relatively easy to maintain in view of the high standards required in the food industry.

IN THE DRAWINGS

FIG. 1 is a side elevational view of an apparatus for marinating meat products in accordance with the method of the present invention;

FIG. 2 is a left end elevational view of the apparatus shown in FIG. 1;

DETAILED DESCRIPTION

Figure 3:
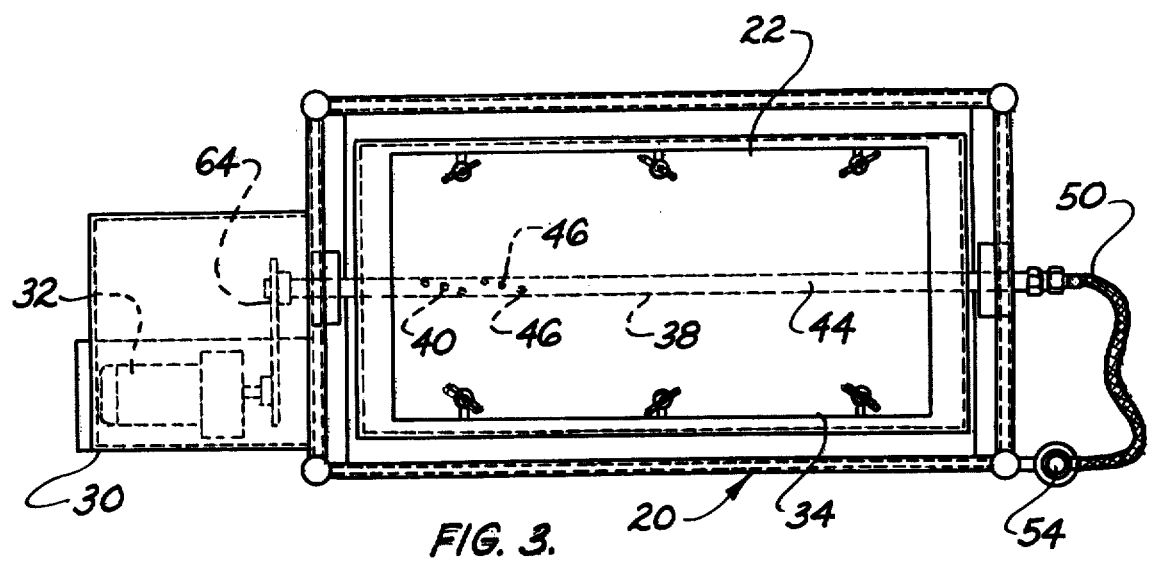
FIG. 3 is a top plan view of the apparatus shown in FIG. 1.

Referring in detail to the drawings, an apparatus constructed in accordance with the present invention is illustrated in FIG. 1 and includes a frame means, indicated generally at 20, which supports a housing 22 which forms a vacuum chamber 24. However, as described in detail later herein, the vacuum aspect of the present invention for some applications may be eliminated if desired. Frame means 20 includes legs 26, horizontal support members 28, and a shelf 30 which supports a motor driving means 32. Chamber 24 is provided with a plurality of inwardly directed flanges or fins 25 which will be described in detail later herein.

Housing 22 is provided with a sealable door or opening 34 which is removably mounted by means of wing nuts 36. Housing 22 is also rotatably mounted to frame means 20 via a shaft 34 mounted on bearing members 40 which are fixed to a pair of flanges 42. Flanges 42 are in turn fixed to frame means 20 in any suitable conventional manner, such as welding for example.

Figure 4:
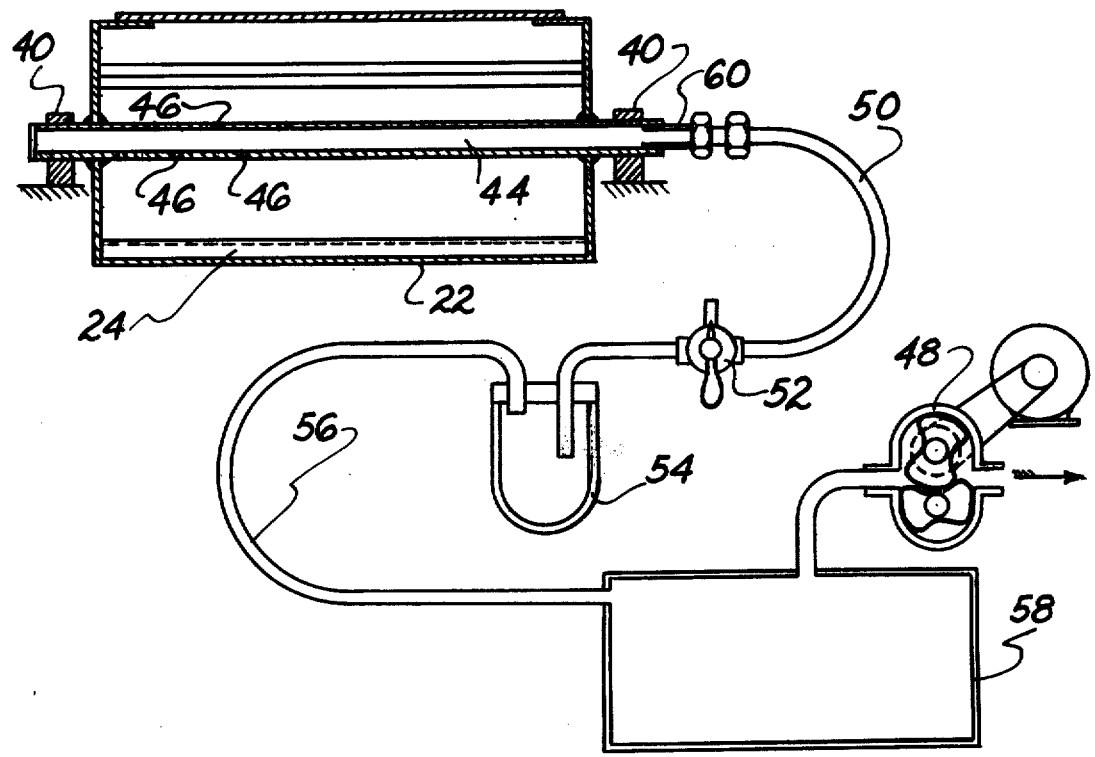
FIG. 4 is a diagrammatic view of the vacuum pump system illustrated as associated with the vacuum chamber and forming a portion of the present invention.

As best seen in FIG. 4, shaft 38 extends through chamber 24 and for vacuum operation is preferably hollow to form a passage means 44. Passage 44 communicates with a plurality of ports 46 which in turn communicate with chamber 24. The left end of passage means 44 is sealed and the right end, as seen in FIG. 1, communicates with a vacuum pump 48 via tubing hose 50, valve means 52, liquid trap 54, tubing hose 56 and reservoir 58.

A rotable connector 60 extends from the end of passage means 44 and is operably connected to hose 50 to maintain a sealed connection during rotation of shaft 38. Preferably connector 60 is the conventional quick-disconnect type which may be quickly and easily removed. In such a case, the valve means 52 would not be necessary.

As best seen in FIG. 1, housing 22 and shaft 38 are mounted at a slight inclination relative to the horizontal to elevate the open end of passage 44. This is desirable when the vacuum system is employed to reduce any tendency for any of the liquid marinating solution to be drawn into the air lines and eventually into the vacuum pump 48. Trap 54 is a precautionary measure to further reduce the possibility of liquid reaching the compressor unit which might cause expensive breakdown.

In operation, chamber 24 is filled with a predetermined quantity of marinating solution, the level of which must be below ports 46 in shaft 38 to avoid liquid being pulled into the air system. As used herein, marinating solution is defined as any solution of flavoring agents or tenderizers or a combination of soluble ingredients which enhance flavor or the desirability of the food products. Conventional solutions of the kind contain salt, spices and preservatives for example.

It is desirable when using the vacuum system to maintain a substantial air space in chamber 24 above the level of the liquid bath or pool and to add only a sufficient quantity of marinating solution to assure that the food products are maintained in a wet, but not necessary, submerged condition throughout the treatment. It should be pointed out that the level of marinating solution decreases significantly during treatment as it becomes absorbed by the meat product.

After the chosen marinating solution is added to chamber 24, the load of meat products may be added and door 34 is securely closed and sealed. The operator then turns an appropriate switch, such as on-off buttons 60' and 62 to start motor drive means 32 which is operatively connected to shaft 38 via a conventional gear reduction assembly indicated generally at 64.

It should be noted that other conventional means for providing the desired rotation of housing 22 may be employed without departing from the spirit of the present invention.

The rate of rotation of housing 22 to obtain the desired degree of agitation of the carcass sections may vary between approximately 3 to 70 rpms. The lower range of speeds of rotation are quite adequate in a large diameter chamber designed to handle relatively large loads. For example, employing a drum chamber approximately three feet in diameter and five feet in length, a speed of six rpm works quite well. In a smaller model, designed for approximately eight to ten chickens, speeds of 25 to 40 rpm work quite well.

Generally speaking, an increase in the rate of rotation within the limits noted and with results in an increase in agitation, will increase the rate of absorption up to certain points. However, the rate of rotation and agitation should not be so severe as to cause multilation of the product which leads to an undesirable appearance. Further, it has been found that extreme agitation is not necessary to achieve the desired rate of absorption and surprisingly gentle agitation of the products give excellent results.

As each fin 25 approaches the lowest point during rotation of the housing 22, some of the meat products are engaged by the fin and carried upwardly until that fin passes the horizontal position. Upon further rotation the meat product falls off and drops into the pool of marinating solution or onto the meat products below. The meat products above this lowest layer tend to be tumbled and agitated and move toward the bottom wall of the chamber.

In this manner, means are provided by rotation of housing 22 and fins 25 to agitate or tumble the products against one another as well as to move the products into and out of contact with the liquid bath. In accomplishing this, the products are also directly exposed for at least some short time interval to the negative pressure in the chamber while the products are not fully submerged in the liquid bath.

It is believed that the excellent and very surprising results obtained using the teaching of the present invention are attributed to tumbling of the products in the chamber containing the marinade. As indicated in the examples which follow later herein, tumbling or agitation of the poultry sections, even in the absence of a reduced pressure, provides a means to introduce the marinade solution into the poultry sections in a uniform and surprisingly efficient manner. Further, it was noted that the use of negative pressure during the tumbling cycle did not cause a significant increase in the amount of marinade solution absorbed for a given time interval, but did cause more of the marinade solution to be absorbed into the bone structure of poultry sections. This result was discovered to prevent the darkening effect of the poultry bone structure after freezing and subsequent thawing and cooking.

The problem of the discolorization of the bone structure of frozen poultry upon thawing and cooking which has been observed in the industry for a long time, has heretofore never been solved satisfactorily. Therefore the method of the present invention utilizing the negative pressure during the tumbling cycle is clearly an important advance in the industry for the preparation of frozen poultry goods. The present invention represents not only the significant increase of production rates, but further achieves the elimination of a long-recognized problem in a simple and efficient manner.

It should also be noted, however, that in other applications wherein the marinade product is to be cooked soon after the marinade treatment, the vacuum system while desirable, is not necessary to achieve excellent absorbtion results. For example, in the fast food industry, a batch of 6 to 10 poultry carcasses can be marinaded for fifteen minutes without using negative pressure and subsequently removed. Then these marinaded sections may be cooked in a conventional manner. For all practical purposes, the uniformity and the amount of the marinade solution absorbed is not detectably different in the taste of the carcass sections when compared with similarly prepared carcass sections in which the negative pressure system was employed.

It should be noted however, that a minimum time period for introducing usefully significant amount of the marinade solution is approximately 2 minutes employing moderate agitation of the poultry products while a minimum of 5 minutes is preferred for commercial purposes. Most applications for present commercial uses do not need to be treated in this manner for more than 30 minutes and it has been found that a time period of between 5 to 15 minutes is quite adequate to accomplish the desired results.

If one chooses to employ a vacuum in the process of the present invention for the purposes of preventing the darkening effect on the bone structure described herein, a minimum partial vacuum or negative pressure of about 20 inches of mercury is necessary to achieve desireable results.

It has been observed that a minimum of between approximately 2½ to 3 percent by weight of the marinating solution can be effectively introduced into the products in the chamber in approximately a 5 minute period at minimal rotational speeds of the chamber described herein in the range of 3 to 6 rpms.

Tests were conducted with poultry carcass sections fully submerged without agitation in the liquid bath for 30 to 60 minutes with a negative pressure of 28 inches of mercury maintained in chamber 24. The results showed no appreciable absorbtion of a conventional marinating solution, less than 1 percent by weight for example.

However tests conducted in accordance with the present invention and in the apparatus described, showed that poultry carcass sections absorbed up to 18 percent by weight in the 10 minute time interval under a negative pressure of 28 inches of mercury. Similarly, equivalent conditions employing agitation of the products as described herein with no vacuum showed similarly remarkable absorbed amounts.

This phenomenal difference in results appears clearly to be associated with the tumbling or agitation during the time the product is exposed to the marinade solution.

The amount of marinating solution absorbed can be controlled by varying the exposure time, the degree of product agitation in the chamber and the amount and strength of the marinating solution in the chamber available to be absorbed by the food pieces.

Since the rate and degree of absorption of the present invention is so much greater than shown in the prior art and because of the fact that the absorbtion can be controlled within relatively accurate limits, truly significant advantages may be realized.

For example, in one commercial application, poultry carcass sections were treated in the apparatus described herein for a ten minute period beginning with the activation of the rotation of housing 22 and the vacuum pump 48. It took approximately five minutes for the negative pressure in chamber 24 to reach 28 inches of mercury which was held for five more minutes. The poultry sections were removed and tested. The variance in the amount of marinating solution absorbed fell within eight to twelve weight percent. The amount of marinating solution initially introduced into chamber 24 was approximately fifteen-sixteen percent by weight of the load of poultry carcass sections introduced.

In another test, the same procedure was followed except, the amount of marinating solution initially introduced was approximately 30 percent by weight of the load and after reaching a negative pressure of 28 inches of mercury, the poultry sections were left in the chamber for ten minutes. The products were subsequently removed and tested. The range of absorption of the marinating solution by the sections was between 15 and 18 percent by weight. Housing 22 was rotated at a speed of six revolutions per minute in both tests.

These two examples indicate clearly the superior results of the method and apparatus of the present invention. In view of the needs for commercial preparation of marinated products, the problems involved with a large inventory and relatively extensive marination time is eliminated. Additionally, the results of the present invention are superior to products marinated in other prior methods. And further, using the method of the present invention does not require any unusual preparation of the product such as piercing each piece of meat with a large number of needles, pins or the like.

To illustrate further the present invention, the following examples are given:

EXAMPLE I

Twenty pounds of chicken carcass sections, nine sections per chicken, were placed in a marinating apparatus constructed in accordance with the present invention. The carcass sections were conventionally prepared for normal cooking with no piercing or the like.

The marinating chamber contained 3 quarts of marinating solution containing 4.5 percent salt and a vacuum of approximately 28 inches of mercury was present in the chamber. The apparatus was actuated with the rotational speed at approximately 35 rpm. The exposure time during rotation was approximately 15 minutes. The carcass sections were removed and compared to control chicken carcass sections which were not marinated in any way.

The following results were noted subsequent to marination but prior to cooking and then after cooking.

The control chicken carcass sections comprising the keel and drumstick portions were noted to contain 74.48 percent and 77.40 percent moisture respectively prior to cooking. The salt content was determined as 0.094 percent and 0.103 percent respectively. After conventional breading and cooking, the respective moisture contents were 64.92 percent and 67.78 percent while the salt content was 0.08 percent and 0.112 percent.

The marinated chicken carcass sections comprising the keel and drumstick sections were tested and the respective moisture content for these sections were determined to be 73.36 percent and 76.84 percent. The salt content rose to 0.690 percent and 0.360 percent respectively.

After cooking in the same manner as above for the control specimen, the moisture and salt determinations were the following: Keel — 67.33 percent mositure, 0.480 percent salt; Drumstick — 69.67 percent moisture, 0.540 percent salt.

The room temperature and the temperature of the marinade solution and of the poultry meat were the same for both tests.

Casual taste tests clearly indicated the rise in the salt content of the marinated chicken and a noted increase in tenderness as compared to the control specimen.

EXAMPLE II

The same general procedures were followed as in Example I except no vacuum was pulled in the marinating chamber during the 15 minute exposure time. Rotation for agitation was the same.

After marination but prior to cooking, analysis tests indicated the following: Keel — 73.64 percent moisture, 0.510 percent salt; Drumstick — 72.84 percent moisture, 0.330 percent salt.

After conventional cooking as in Example I, the analysis indicated the following: Keel — 66.62 percent moisture, 0.370 percent salt; Drumstick — 68.34 percent moisture, 0.370 percent salt.

Casual taste tests of 9 individuals revealed no significant detectable difference in salt flavor compared to the marinated product obtained from Example I.

EXAMPLE III

The same procedure was employed as in Example I except the volume of marinating solution was prepared by adding eight ounces of salt marinade to three quarts of water to increase the percentage of salt in the solution.

Analysis revealed a higher salt content in the marinated specimens both prior and subsequent to cooking.

EXAMPLE IV

The procedure employed in Example II was repeated using the marinating solution prepared in Example III of eight ounces of salt marinade in three quarts of water.

The marinated product was cooked the same as the previous examples and analysis indicated a relatively small decrease in the salt content as compated to products obtained in Example IV.

Casual taste tests were conducted as before comparing the resulting products from Examples III and IV. The taste tests indicated that all subjects stated that all test products had excellent flavoring and tenderness characterisitics. Further, it was indicated that no substantial difference in salt content was distinguishable among the subjects between the product treated with or without vacuum.

Further tests were conducted with products prepared in accordance with Examples III and IV relative to the effects of freezing the marinated product and subsequently thawing and cooking the product. It was noted in all cases that the bone in poultry sections marinated without the use of vacuum after freezing and subsequent cooking darkened to almost black in appearance. On the contrary, the bone in the poultry sections marinated using vacuum in accordance with the present invention showed no darkening effect.

In view of the relatively slight difference in salt content between the products treated with or without vacuum and the indistinguishable taste testing, it is theorized that the use of vacuum in the manner described herein has a relatively small effect on the total salt absorbed as far as taste is concerned. However, the lack of the normally observed darkening effect on the bone portions indicate that the vacuum treatment provides a deeper penetration of salt into the bone portions.

These results are merely illustrative of many tests which further reinforced the results noted herein. Additionally, all the product marinated in accordance with the present invention both with and without vacuum were noted to possess a visually observable more pleasing plump appearance after cooking. Apparently the marinating process of the present invention provides a consistent surface moisture which enhances the adhesion of the breading flour to the carcass section.

It should be pointed out that the conclusions reached from the testing of the process of the present invention indicated that the use of vacuum during the tumbling cycle is not necessary to achieve an excellent product in applications where the product is to be cooked soon after marinating. However, if the marinated product is to be frozen and shipped, it is highly desirable to employ vacuum to avoid the darkening effect on the bone structure after cooking.

What is claimed is:

1. A method of marinating poultry food products comprising the steps of placing poultry food products in a closed chamber containing a predetermined quantity of a liquid marinating solution and having significant air space above the level of said marinating solution; tumbling said food products while alternately immersed in said marinating solution and exposed to said air space in said chamber by rotating said chamber at speeds between approximately 3 to 70 r.p.m. while withdrawing air from said chamber to expose said products to a negative pressure of at least 20 inches of mercury for a time interval greater than 2 but less than 30 minutes whereby said products are caused to absorb at least two and one half percent by weight of the marinating solution during said tumbling.

2. A method of preparing marinated poultry products comprising the steps of placing a predetermined quantity of poultry carcass sections in a closable chamber containing a predetermined quantity of marinating solution; tumbling said products by rotating said chamber at speeds between approximately 3 to 70 r.p.m. to cause agitation of said products in contact with said solution for a time period of at least 5 minutes whereby said products are caused to absorb at least two and one half percent by weight of the marinating solution during said tumbling; and removing said products from said chamber.

3. The method as defined in claim 2 wherein said poultry products are tumbled in contact with said marinating solution for a time period between at least five minutes and not more than thirty minutes whereby said products are caused to absorb between at least 3 and not more than 18 percent by weight of marinating solution.

4. A marinated poultry product as produced by the method of claim 1.

5. A marinated poultry product as produced by the method of claim 2.

* * * * *